United States Patent [19]

Grüniger

[11] 4,059,146
[45] Nov. 22, 1977

[54] HEATING SYSTEM WITH A THERMAL PUMP

[75] Inventor: Emil Grüniger, Altendorf, Switzerland

[73] Assignee: IDC Chemie AG, Rapperswil, Switzerland

[21] Appl. No.: 635,356

[22] Filed: Nov. 26, 1975

[30] Foreign Application Priority Data

Nov. 28, 1974   Switzerland ................ 15818/74

[51] Int. Cl.² .................. B22C 7/00; F25B 27/02; F25D 23/12; F24J 3/02
[52] U.S. Cl. ........................... 165/45; 62/238; 62/260; 126/271
[58] Field of Search ............ 62/238, 260, 2; 237/1 A; 165/45; 61/5; 126/270, 271

[56] References Cited

U.S. PATENT DOCUMENTS

| | | | |
|---|---|---|---|
| 1,130,870 | 3/1915 | Willsie | 126/271 |
| 2,428,876 | 10/1947 | Hankins | 62/260 |
| 2,749,724 | 6/1956 | Borgerd et al. | 62/260 |
| 2,780,415 | 2/1957 | Gay | 62/260 |
| 3,072,920 | 1/1963 | Yellott | 126/271 |
| 3,077,190 | 2/1963 | Allen | 126/271 |
| 3,875,996 | 4/1975 | Kohorn | 165/45 |
| 3,933,628 | 1/1976 | Varani | 126/271 |
| 3,965,694 | 6/1976 | Vignal | 62/260 |

*Primary Examiner*—Lloyd L. King

[57] ABSTRACT

A heating system with a thermal pump including an evaporator section consisting of a piping network buried in the ground. The piping network is shielded by a translucent screen arranged above the ground such to prevent a heat loss of the ground and to form a space for heat storage between screen and ground.

3 Claims, 3 Drawing Figures

HEATING SYSTEM WITH A THERMAL PUMP

BACKGROUND OF THE INVENTION

1. Field of Invention

This invention relates to heating systems with a thermal pump, including an evaporator section formed by a piping network buried in the ground, a compressor for compressing the evaporated working fluid and a condensing section operating as heating plant.

2. Description of Prior Art

The construction of heating systems with a thermal pump are well known to persons skilled in the art. Such construction is substantially similar to the construction of a refrigerating apparatus, with the exception that the process operates at a different temperature level. The working fluid, e.g., "Freon 12" evaporates at the ambient ground temperature and thereby extracts the desired quantity of heat thereof. The evaporated working fluid gets compressed thereafter to an elevated pressure and discharges in a downstream following condensing section heat to a heating system by extracting the heat of vaporization from the vapor. A heating system with a thermal pump has been disclosed, for example, in the journal "Elektrowaerme International" 30 (1972) Al-January. It has been proven that it is possible, depending on the condition of the ground, to extract during a uninterrupted operation in the winter season 20–30 kcal/hour sq. meter from the ground. Because the ground freezes up to a depth of about 70 centimeters, it is common practice to bury the piping network forming the evaporator section to a depth of 1 meter which necessitates substantial work and expenditures. The heat quantity which can be hourly extracted per square meter depends on the heat drop between the ground temperature and the evaporation temperature of the working fluid, and it has been found that due to the thermal conductivity of the ground the distance between adjacent pipes of the conduit network of known heating systems with a thermal pump must be at least 1 meter. In order to sufficiently heat, for example, a one family house by extracting heat from the ground an accordingly rather large section of the ground must be provided with pipes forming the conduit network.

One object of the invention is to provide a heating system with a thermal pump having an improved output.

A further object is to reduce the work and expenditures arising from installing the conduit network in the ground.

A heating system with a thermal pump in accordance with the invention includes a translucent screen shielding the ground from the atmosphere, such that a heat storage of the heat radiated from the sun and penetrated through the screen is provided and that the space defined between the ground surface and screen forms and insulation against heat loss to the atmosphere.

Accordingly an inventive heating system provides for a substantially higher temperature of the ground thus allowing an increased extraction of heat per unit area and reducing the distance between adjacent pipes of the conduit network to about 50 centimeters. Furthermore, the placing of the pipes in the ground can take place by simply forming separate narrow trenches by means of a ground mill or trench digger, in contrast to the prior art according to which the depth of the conduit network calls for the removal of earth to a depth of 1 meter.

BRIEF DESCRIPTION OF THE DRAWINGS

A better understanding of the invention may be had from a consideration of the following detailed description taken in conjunction with the accompanying drawing, in which.

DETAILED DESCRIPTION

Figure 1:
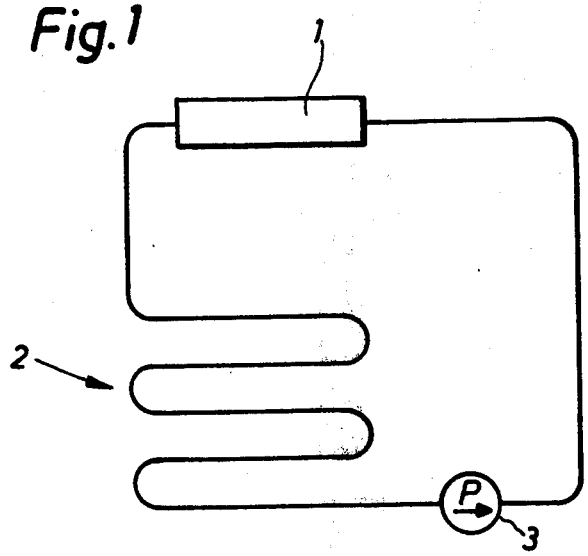
FIG. 1 is a schematic drawing of the arrangement of a heating system with a thermal pump.

In FIG. 1 the numeral 1 denotes a condensing section of the working fluid, which condensing section discharges heat to the heating system of, e.g., a house. The condensing section 1 discharges heat to heat the house. The working fluid leaving the condensing section 1 enters a piping network 2 buried in the ground, in which piping network the working fluid evaporates and extracts heat from the ground. Thereafter, the working fluid gets compressed in compressor 3 and discharged into the condensing section 1 to close the loop.

Figure 2:
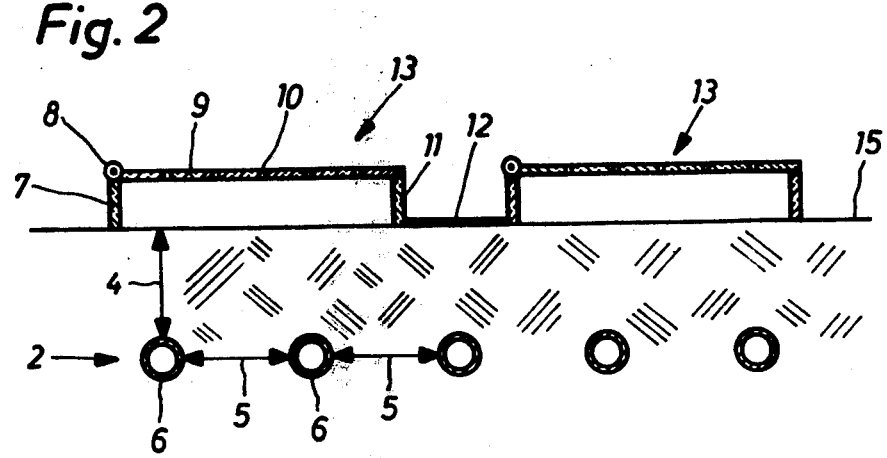
FIG. 2 is a vertical section through a portion of the heating system in accordance with the invention.
Figure 3:
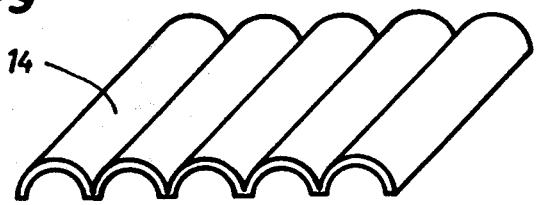
FIG. 3 is a perspective view of a further embodiment of a screen section.

The ground are occupied by a piping network necessary to provide heating for a one family house, and thus the area of the screen takes up a rather large portion of the premises to the extent of 500 square meters. Therefore, as shown in FIG. 2 the screen is preferably divided into several sections 13, between which paths 12 are provided for access to the various sections 13 for mounting or maintenance such as cleaning the screen panels 9. Accordingly, the surface area of any given screen panel 9 can be chosen freely, such that the screen panel 9 forming any one of the sections features a manageable size of a few square meters. At the beginning of the warm season, when no heating of the house is necessary, the entire screen can be easily removed. Every screen panel 9 is made of a rigid material such as glass and is along one of its side edges 8 pivotably mounted to a carrier block 7. The opposite side edge rests on a carrier block 11. Thus an accumulation of snow on the panel can be removed by simply pivoting the panel 9, allowing the snow to slide off the panel 9. In FIG. 3 a further embodiment of the screen is shown. Here an accumulation of snow can be prevented by forming the screen as a set of semicircular arches 14 forming tunnels, such as used for gardening purposes.

In FIG. 2 reference 4 designates the depth of the pipes 6 of the piping netword buried in the ground; i.e., the distance between the uppermost point of the outer surface of any pipe and the ground surface. According to the present invention distance 4 can be made less than 80 centimeters. Reference 5 designates the horizontal distance between any adjacent pipes 6 of the piping network buried in the ground; i.e., the smallest distance between the surfaces of adjacent pipes of the piping network. According to the present invention the distance 5 can be made also less than 80 centimeters.

The other part of the heating system with a thermal pump, i.e. condensor 1, pump 2 are constructed in a known manner, as described in the aforementioned journal, i.e. the heating system can be advantageously designed as a floor heating system incorporating a radiant heating arrangement.

While there has been shown and described above a particular embodiment of the invention for the purpose of enabling a person of ordinary skill in the art to make and use the invention, it will be appreciated that the invention is not limited thereto.

Accordingly, any modifications, variations or equivalent arrangements within the scope of the attached claims should be considered to be within the scope of the invention.

What is claimed is:

1. In a heating system with a thermal pump, including an evaporator section consisting of a piping network buried in the ground, a compressor for compressing the evaporated working fluid, a condensing section operating as heating plant, and a translucent screen for shielding the ground against the atmosphere, such that a heat storage of the heat radiated from the sun and penetrated through the screen is provided and the space defined between the ground surface and the screen forms an insulation against heat loss to the atmosphere, said screen being a sheet-like material with perforations for discharging any accumulated water thereon, the improvement comprising that the distance between adjacent buried pipes of said piping network is less than 80 centimeters and the depth of the buried pipes of said piping network is less than 80 centimeters.

2. In a heating system according to claim 1, wherein said screen is divided into a plurality of plate sections forming passages therebetween.

3. In a heating system according to claim 1, wherein said screen is formed of rigid plate-like material being pivotably mounted along one of its margins.

* * * * *